(12) United States Patent
Zhao et al.

(10) Patent No.: US 12,413,726 B2
(45) Date of Patent: Sep. 9, 2025

(54) DICTIONARY OF TRANSFORMS

(71) Applicant: Tencent America LLC, Palo Alto, CA (US)

(72) Inventors: Xin Zhao, San Jose, CA (US); Yushin Cho, Palo Alto, CA (US); Madhu Peringassery Krishnan, Mountain View, CA (US); Liang Zhao, Sunnyvale, CA (US); Han Gao, San Diego, CA (US); Jing Ye, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 101 days.

(21) Appl. No.: 18/521,504

(22) Filed: Nov. 28, 2023

(65) Prior Publication Data

US 2025/0063170 A1 Feb. 20, 2025

Related U.S. Application Data

(60) Provisional application No. 63/533,571, filed on Aug. 18, 2023.

(51) Int. Cl.
*H04N 19/12* (2014.01)
*H04N 19/136* (2014.01)
*H04N 19/176* (2014.01)
*H04N 19/60* (2014.01)
*H04N 19/70* (2014.01)

(52) U.S. Cl.
CPC ........... *H04N 19/12* (2014.11); *H04N 19/136* (2014.11); *H04N 19/176* (2014.11); *H04N 19/60* (2014.11); *H04N 19/70* (2014.11)

(58) Field of Classification Search
CPC .... H04N 19/12; H04N 19/136; H04N 19/176; H04N 19/60; H04N 19/70
See application file for complete search history.

(56) References Cited

U.S. PATENT DOCUMENTS

| | | |
|---|---|---|
| 2015/0249840 A1 | 9/2015 | Kim et al. |
| 2016/0117812 A1* | 4/2016 | Pandev ................. G06F 18/214 382/149 |
| 2021/0120252 A1 | 4/2021 | Koo et al. |

(Continued)

OTHER PUBLICATIONS

International Search Report and Written Opinion regarding PCT/US 23/81909 dated March 12, 2024, 7 pages.

(Continued)

*Primary Examiner* — Jae N Noh
(74) *Attorney, Agent, or Firm* — Crowell & Moring LLP

(57) ABSTRACT

This disclosure relates generally to video coding/decoding and particularly for a transform dictionary. A method includes receiving the coded video bitstream; determining, based on the coded video bitstream, a transform pile for the current block, the transform pile being one transform pile in a transform dictionary, the transform dictionary comprising a plurality of transform piles, and the transform pile comprising a plurality of transform sets; determining a transform set in the transform pile; determining a transform kernel in the transform set; performing an inverse transform for the current block based on the transform kernel for obtaining a residual block for the current block; and reconstructing the current block based on the residual block.

20 Claims, 13 Drawing Sheets

(56) References Cited

U.S. PATENT DOCUMENTS

| | | |
|---|---|---|
| 2021/0195192 A1 | 6/2021 | Coban et al. |
| 2022/0329800 A1 | 10/2022 | Ray et al. |
| 2023/0083773 A1* | 3/2023 | Peringassery Krishnan ............... H04N 19/91 375/240.02 |

OTHER PUBLICATIONS

Coban et al., "Algorithm description of Enhanced Compression Model 9 (ECM 9)," Document: JVET-AD2025, Joint Video Experts Team (JVET) of ITU-T SG 16 WP 3 and ISO/IEC JTC 1/80 29, 30th Meeting, Antalya, TR, Apr. 21-28, 2023, 76 pages.

* cited by examiner

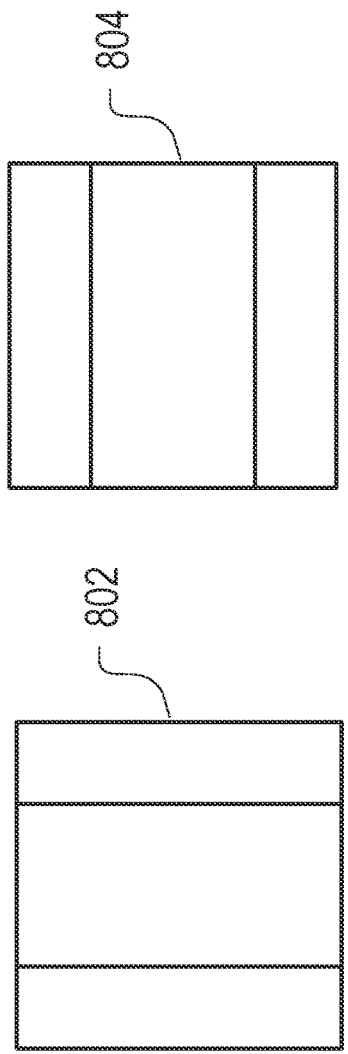
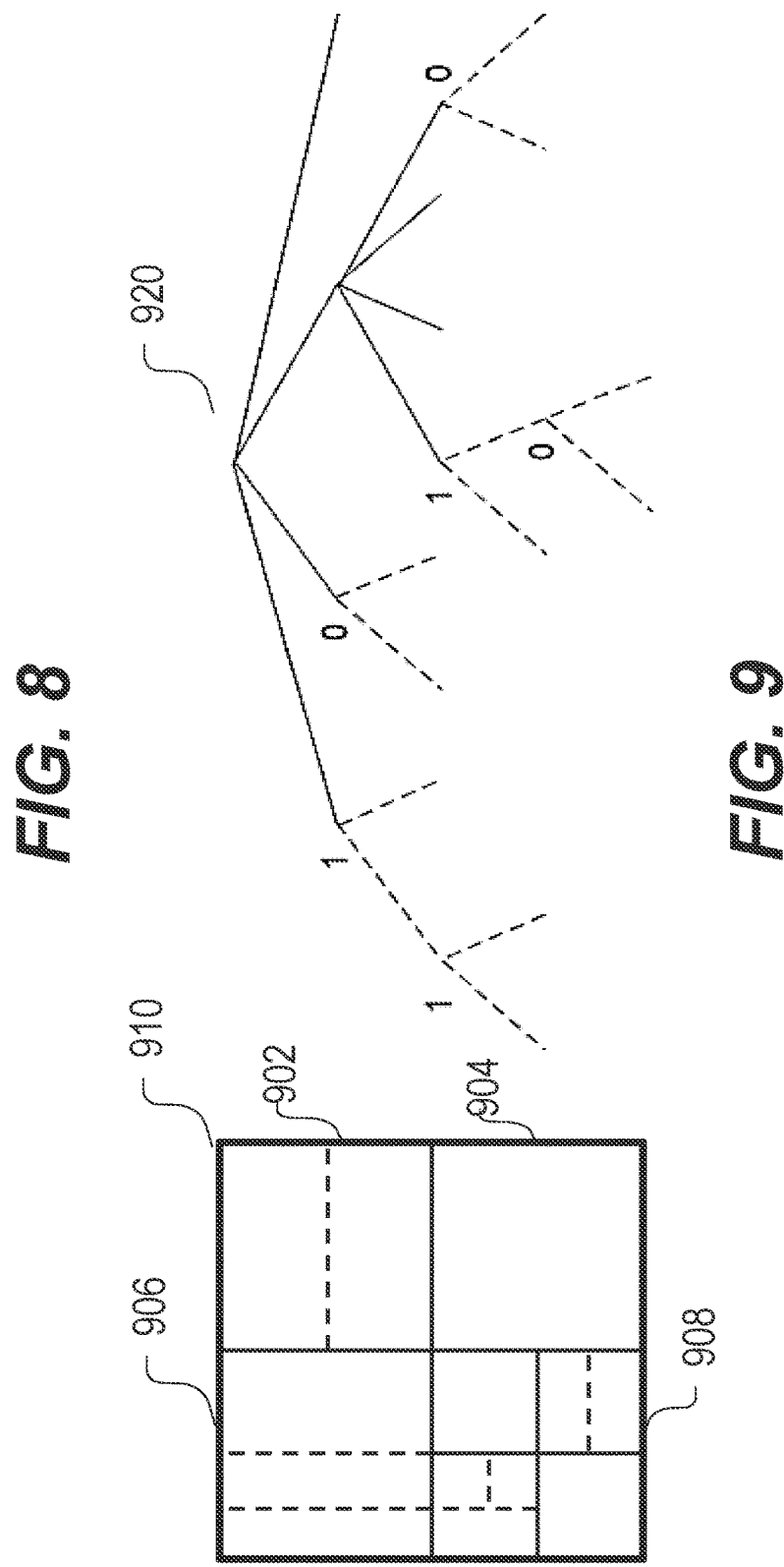

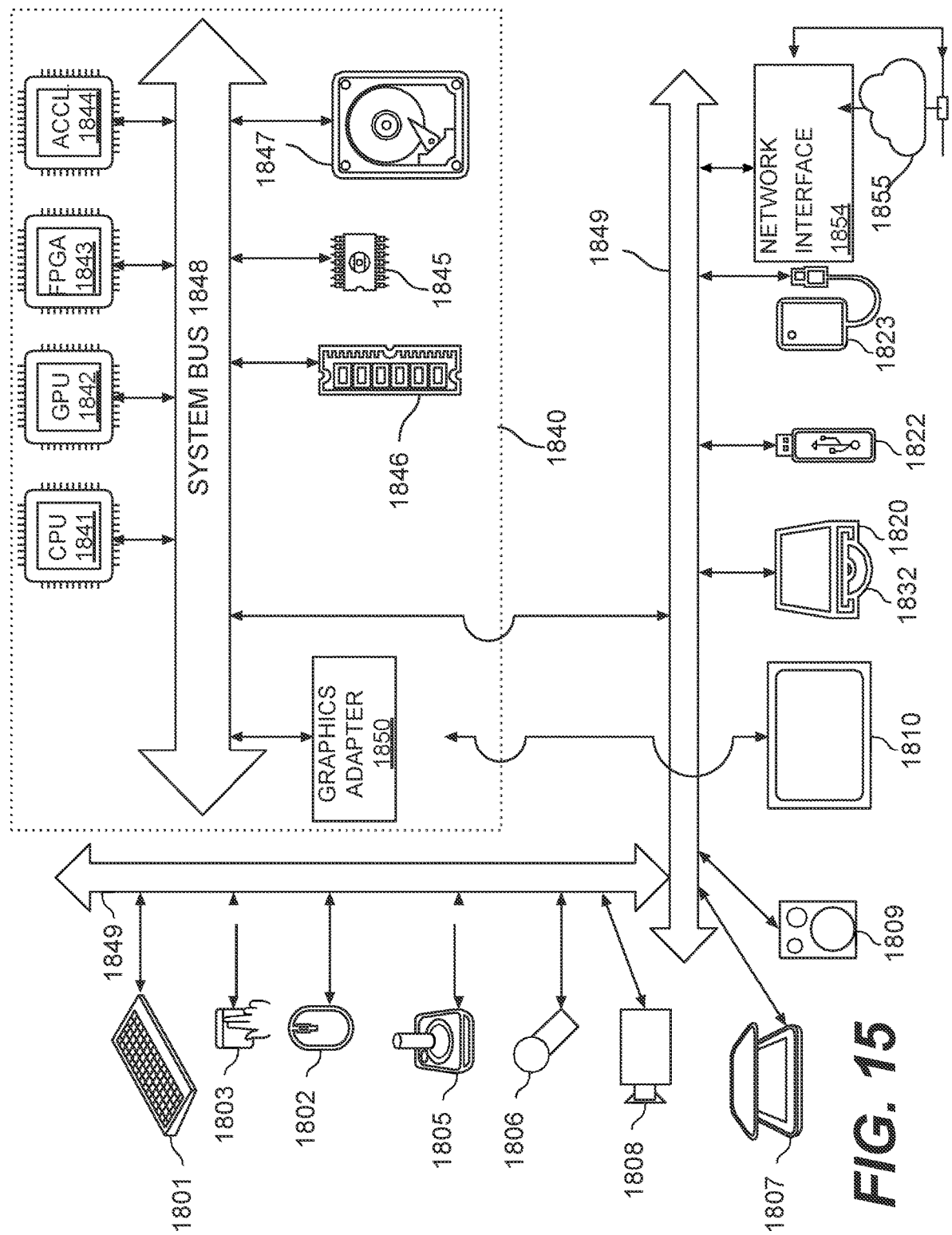

DICTIONARY OF TRANSFORMS

INCORPORATION BY REFERENCE

This application is based on and claims the benefit of priority to U.S. Provisional Application No. 63/533,571, filed on Aug. 18, 2023, which is herein incorporated by reference in its entirety.

TECHNICAL FIELD

This disclosure describes a set of advanced video/streaming coding/decoding technologies. More specifically, the disclosed technology involves a dictionary of transforms.

BACKGROUND

Uncompressed digital video can include a series of pictures, and may specific bitrate requirements for storage, data processing, and for transmission bandwidth in streaming applications. One purpose of video coding and decoding can be the reduction of redundancy in the uncompressed input video signal, through various compression techniques.

SUMMARY

The present disclosure describes various embodiments of methods, apparatus, and computer-readable storage medium for improvement of signaling transform set for a residual block by using a transform dictionary.

According to one aspect, an embodiment of the present disclosure provides a method for decoding a current block of a current frame in a coded video bitstream. The method includes receiving, by a device, a coded video bitstream. The device includes a memory storing instructions and a processor in communication with the memory. The method also includes determining, by the device based on the coded video bitstream, a transform pile for the current block, the transform pile being one transform pile in a transform dictionary, the transform dictionary comprising a plurality of transform piles, and the transform pile comprising a plurality of transform sets; determining, by the device, a transform set in the transform pile; determining, by the device, a transform kernel in the transform set; performing, by the device, an inverse transform for the current block based on the transform kernel for obtaining a residual block for the current block; and reconstructing, by the device, the current block based on the residual block.

According to another aspect, an embodiment of the present disclosure provides an apparatus for processing a current block of a current frame in a coded video bitstream. The apparatus includes a memory storing instructions; and a processor in communication with the memory. When the processor executes the instructions, the processor is configured to cause the apparatus to perform the above methods for video decoding and/or encoding.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which:

FIG. 8 shows another scheme of coding block partitioning according to example embodiments of the disclosure;

FIG. 9 shows another scheme of coding block partitioning according to example embodiments of the disclosure;

FIG. 15 shows a schematic illustration of a computer system in accordance with example embodiments of this disclosure.

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
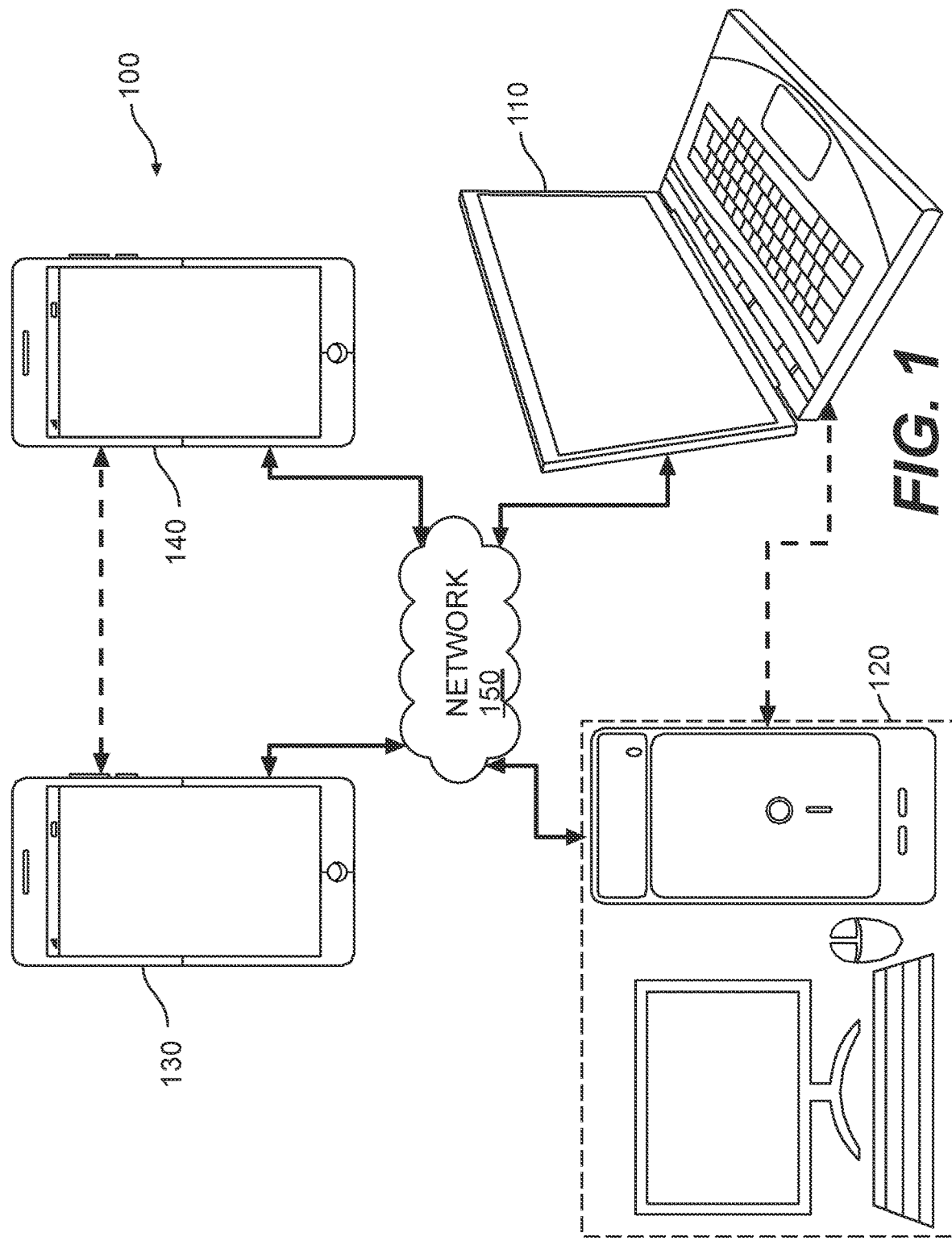
FIG. 1 shows a schematic illustration of a simplified block diagram of a communication system (100) in accordance with an example embodiment.

As shown in FIG. 1, terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
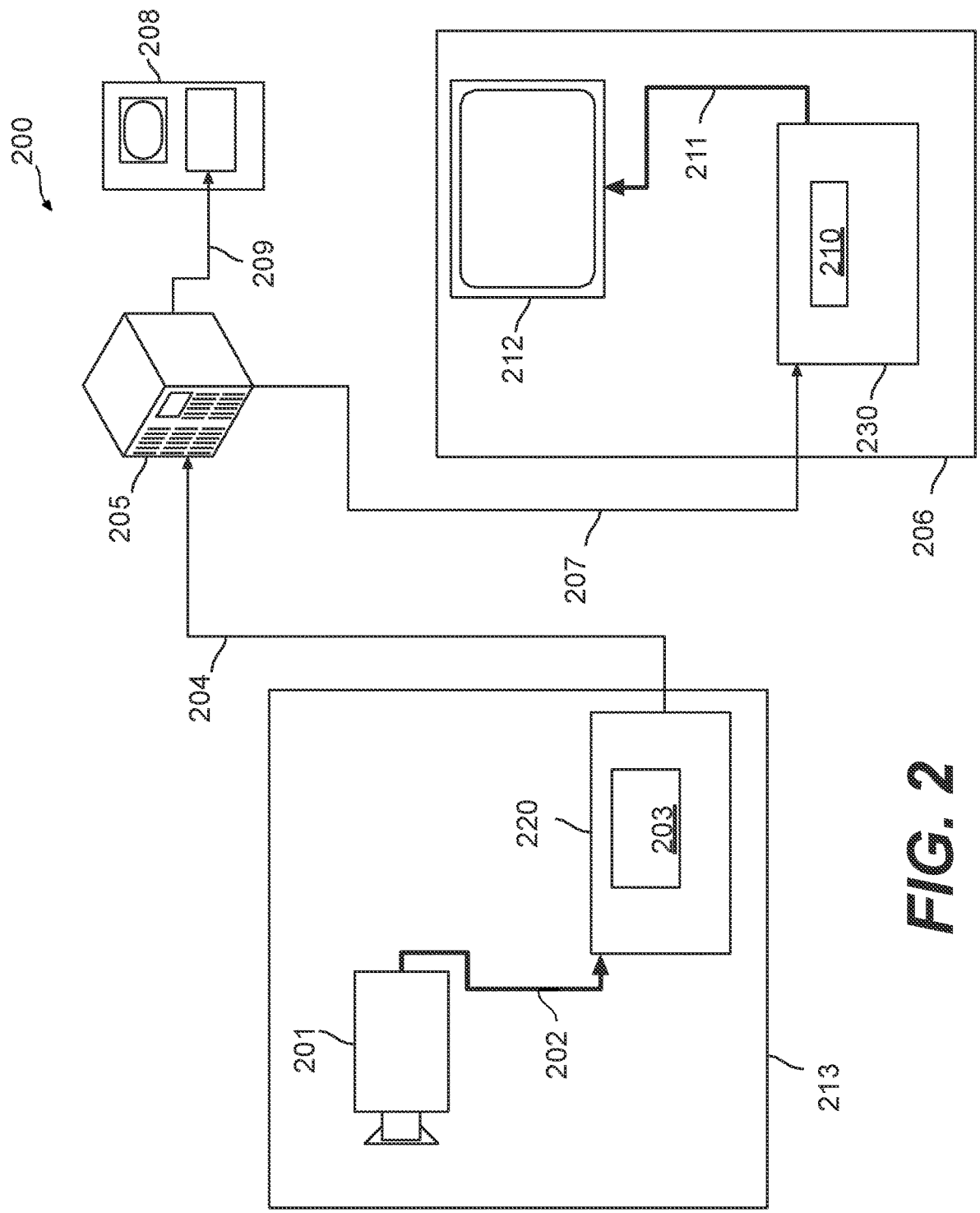
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source (201). The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
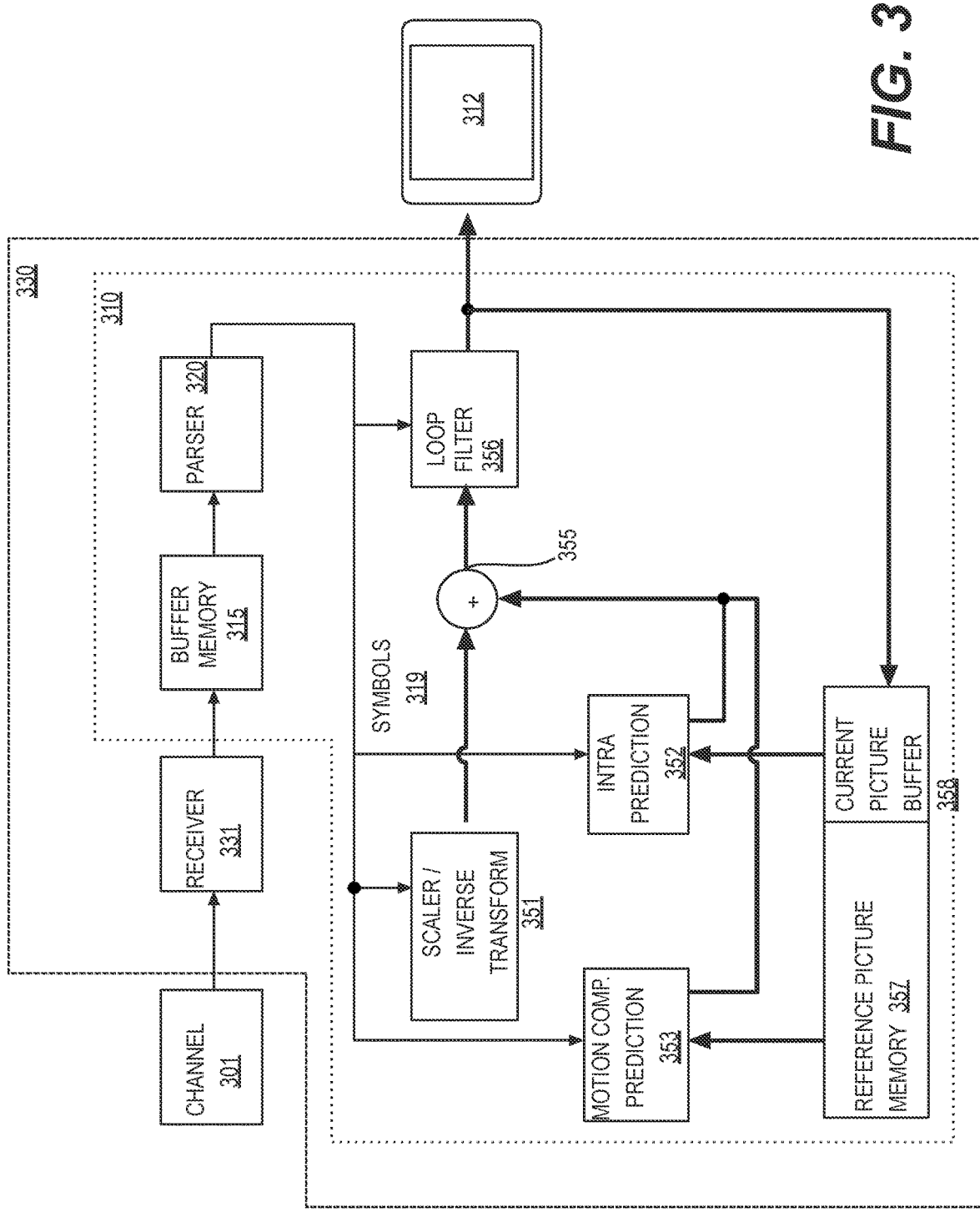
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
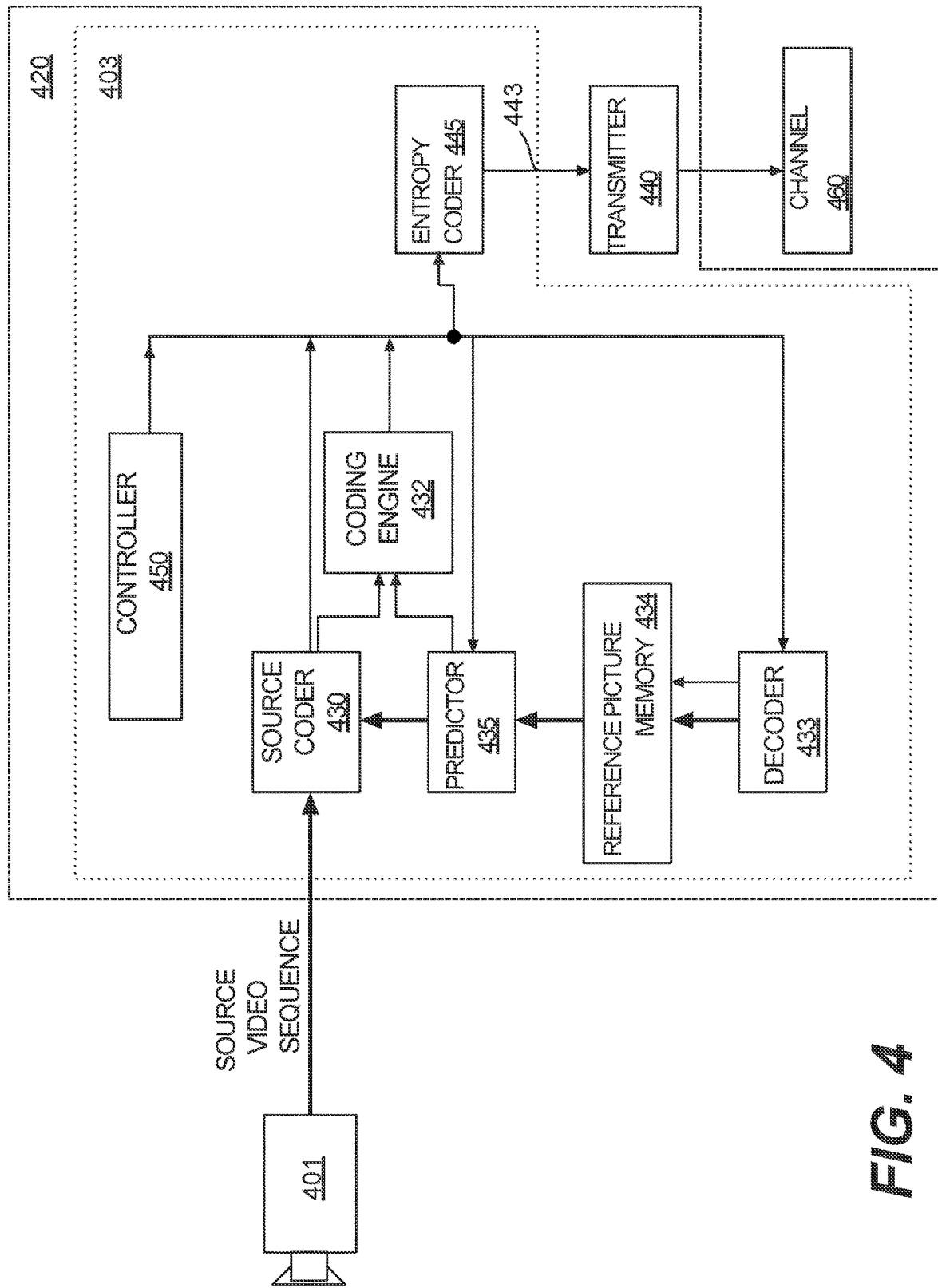
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive picture. Source pictures commonly may be subdivided spatially into a plurality of sample coding blocks as described in further detail below.

Figure 5:
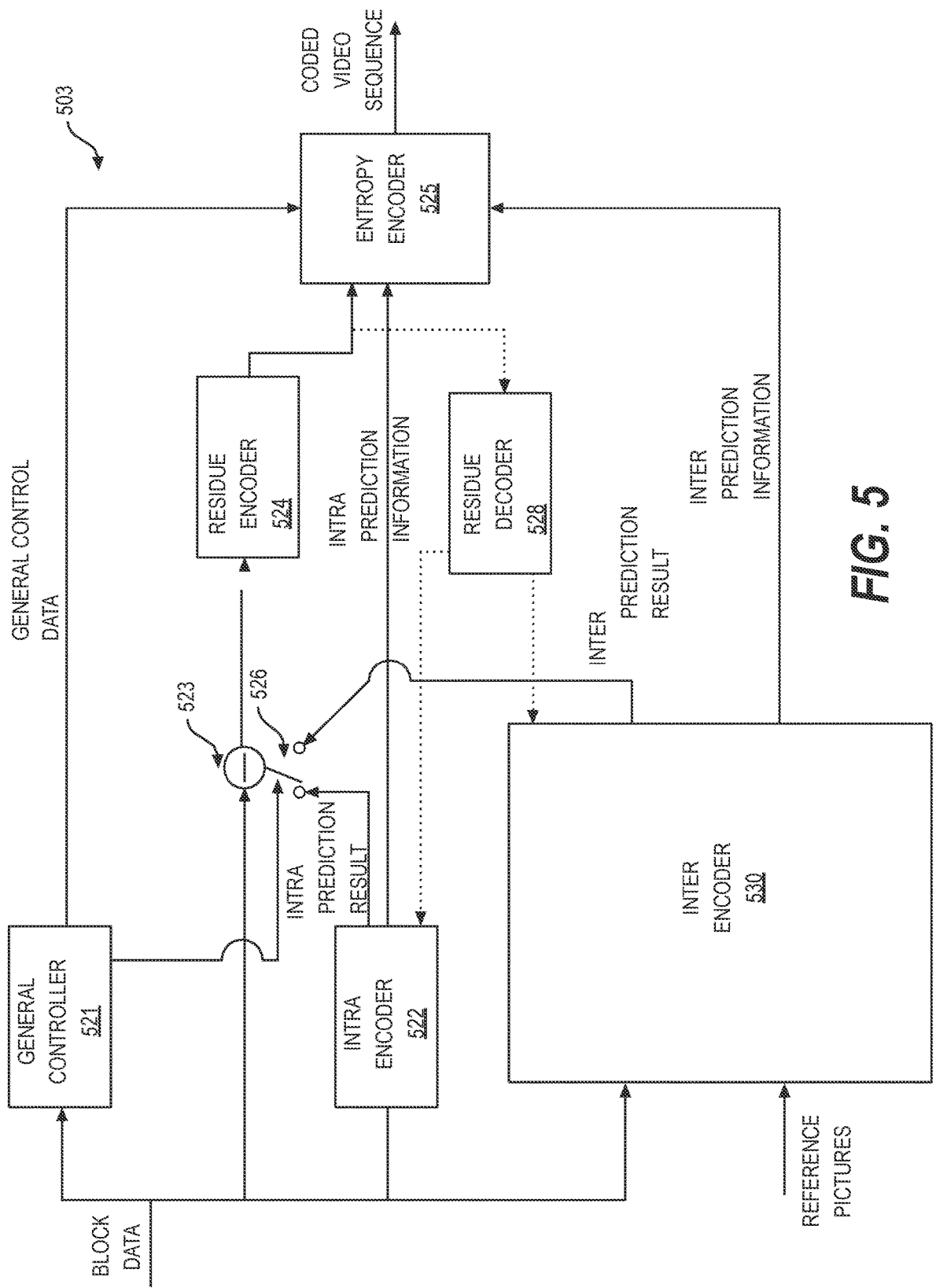
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
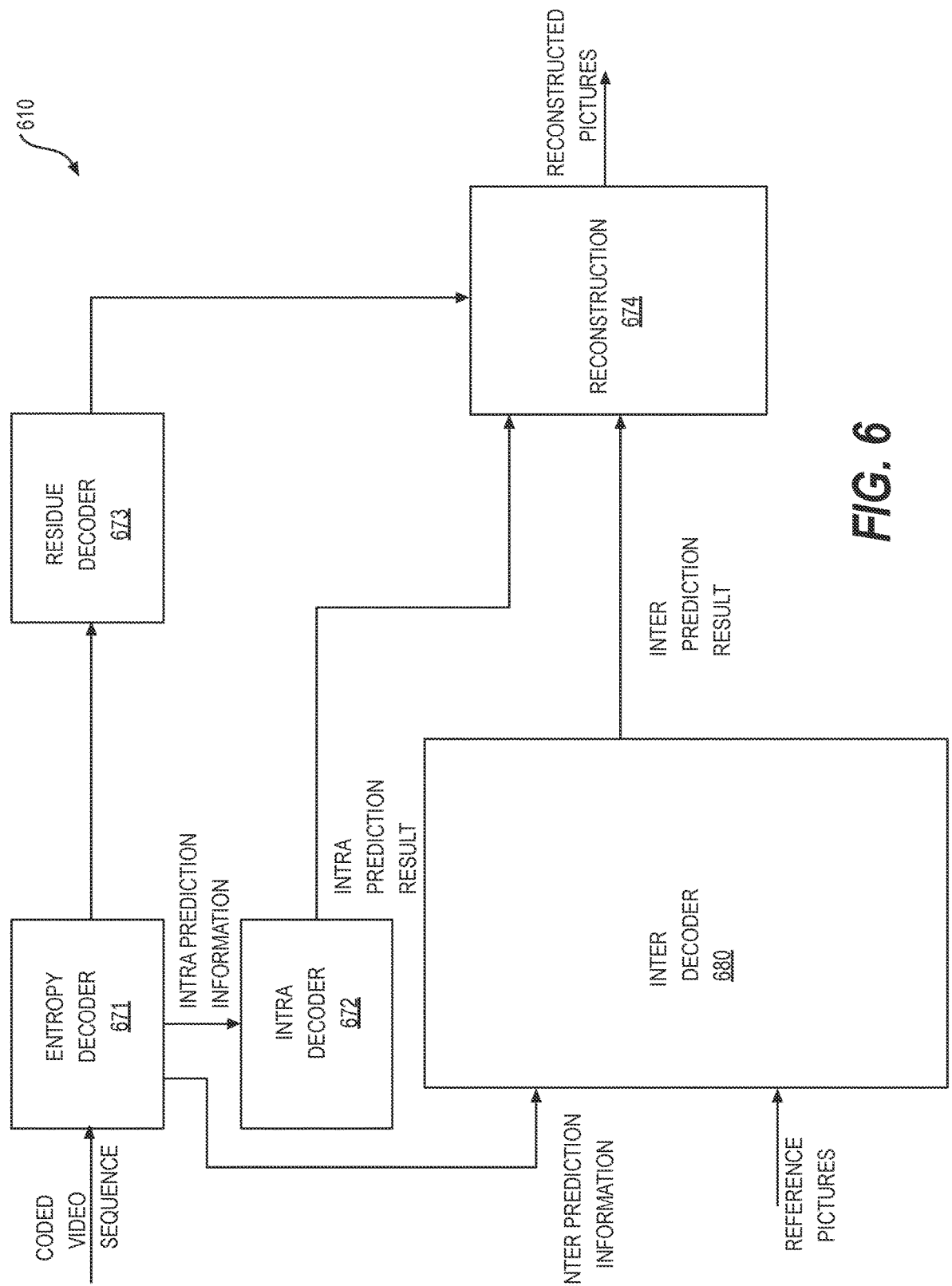
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
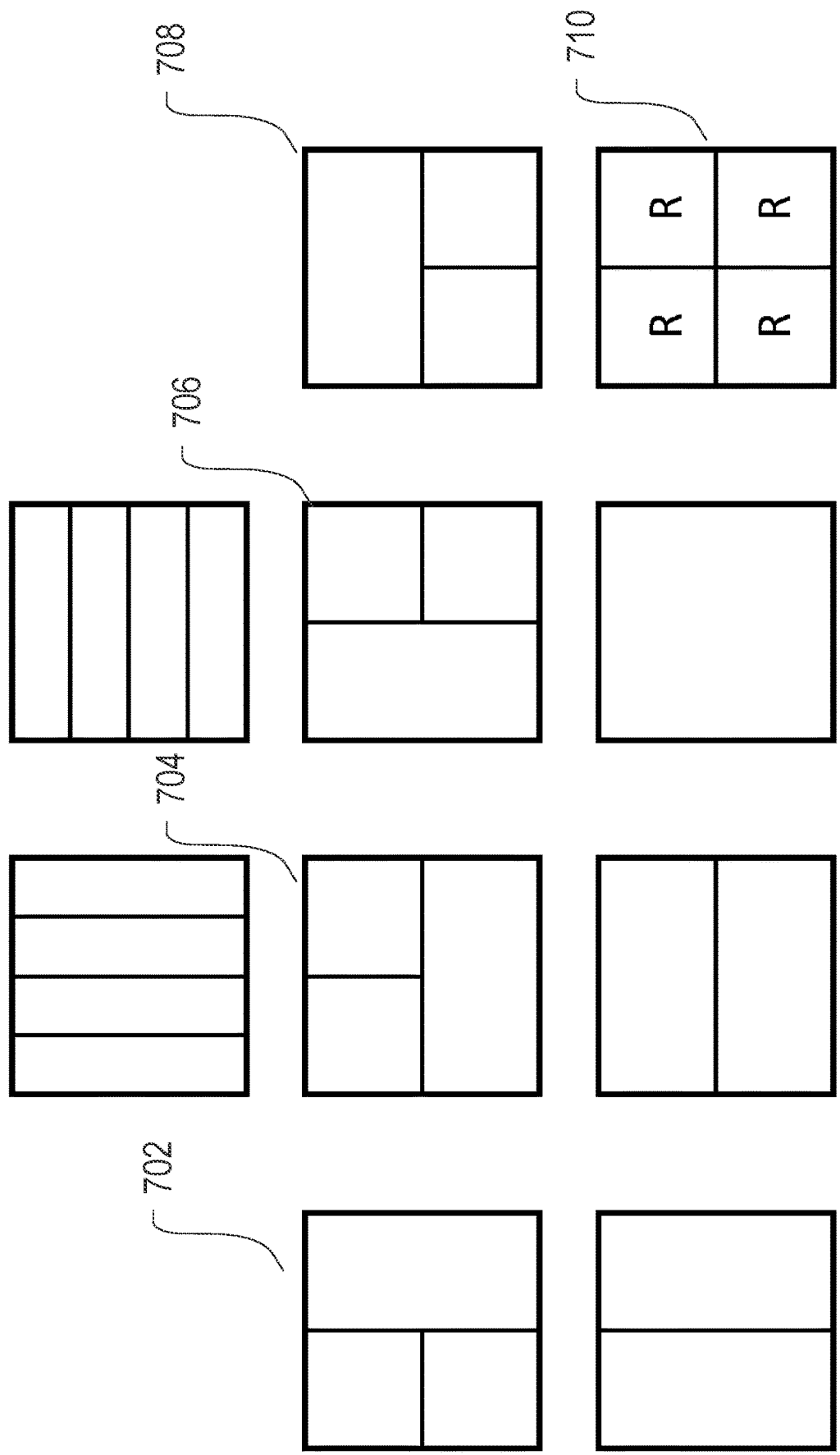
FIG. 7 shows a scheme of coding block partitioning according to example embodiments of the disclosure.

FIG. 7 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 7 includes various 2:1/1:2 and 4:1/1:4 rectangular partitions. In some example implementations, none of the rectangular partitions of FIG. 7 is allowed to be further subdivided. A coding tree depth may be further defined to indicate the splitting depth from the root node or root block. For example, the coding tree depth for the root node or root block may be set to 0, and after the root block is further split once following FIG. 7, the coding tree depth is increased by 1. In some implementations, only the all-square partitions in 710 may be allowed for recursive partitioning into the next level of the partitioning tree following pattern of FIG. 7.

In some other example implementations for coding block partitioning, a quadtree structure may be used. Such quadtree splitting may be applied hierarchically and recursively to any square shaped partitions. Whether a base block or an intermediate block or partition is further quadtree split may be adapted to various local characteristics of the base block or intermediate block/partition.

In yet some other examples, a ternary partitioning scheme may be used for partitioning a base block or any intermediate block, as shown in FIG. 8. The ternary pattern may be implemented vertical, as shown in 802, or horizontal, as shown in 804. While the example split ratio in FIG. 8 is shown as 1:2:1, other ratios may be predefined. In some implementations, two or more different ratios may be predefined. In some implementations, the width and height of the partitions of the example triple trees are always power of 2 to avoid additional transforms.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 9, where a base block is first quadtree split into four partitions, as shown by 902, 904, 906, and 908. Thereafter, each of the resulting partitions is either quadtree partitioned into four further partitions (such as 908), or binarily split into two further partitions (either horizontally or vertically, such as 902 or 906, both being symmetric, for example) at the next level, or non-split (such as 904). Binary or quadtree splitting may be allowed recursively for square shaped partitions, as shown by the overall example partition pattern of 910 and the corresponding tree structure/representation in 920, in which the solid lines represent quadtree splitting, and the dashed lines represent binary splitting. Flags may be used for each binary splitting node (non-leaf binary partitions) to indicate whether the binary splitting is horizontal or vertical. For example, as shown in 920, consistent with the partitioning structure of 910, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:
 CTU size: the root node size of a quadtree (size of a base block)
 MinQTSize: the minimum allowed quadtree leaf node size
 MaxBTSize: the maximum allowed binary tree root node size
 MaxBTDepth: the maximum allowed binary tree depth
 MinBTSize: the minimum allowed binary tree leaf node size In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 9, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

The various CB partitioning schemes above and the further partitioning of CBs into PBS may be combined in any manner. The following particular implementations are provided as non-limiting examples.

Figure 10:
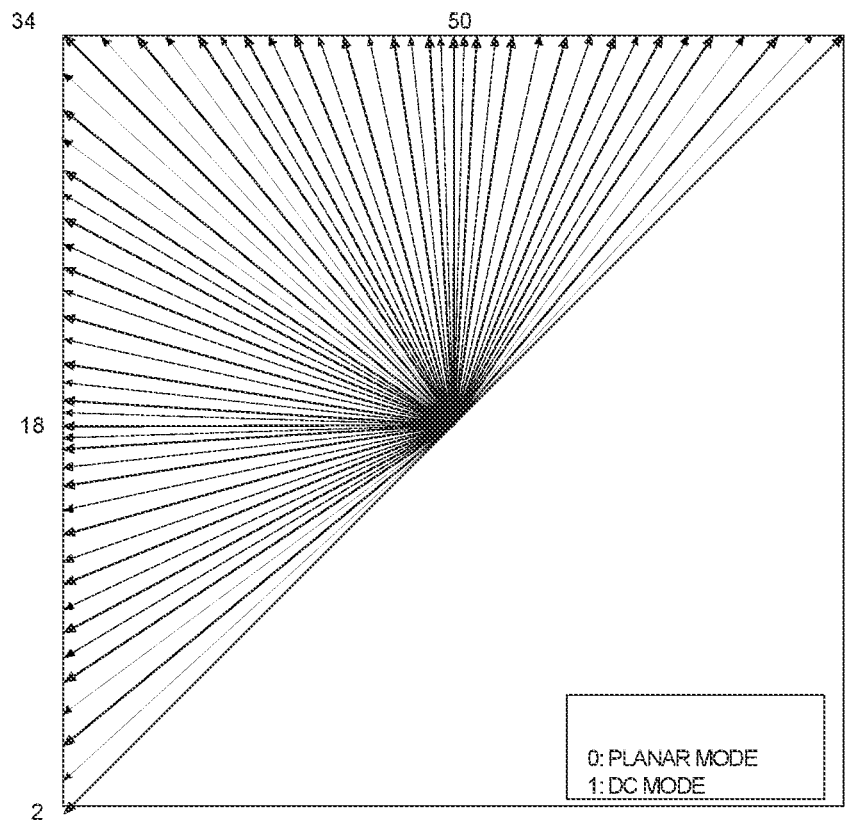
FIG. 10 shows example fine angles in direction intra-prediction.
Figure 11:
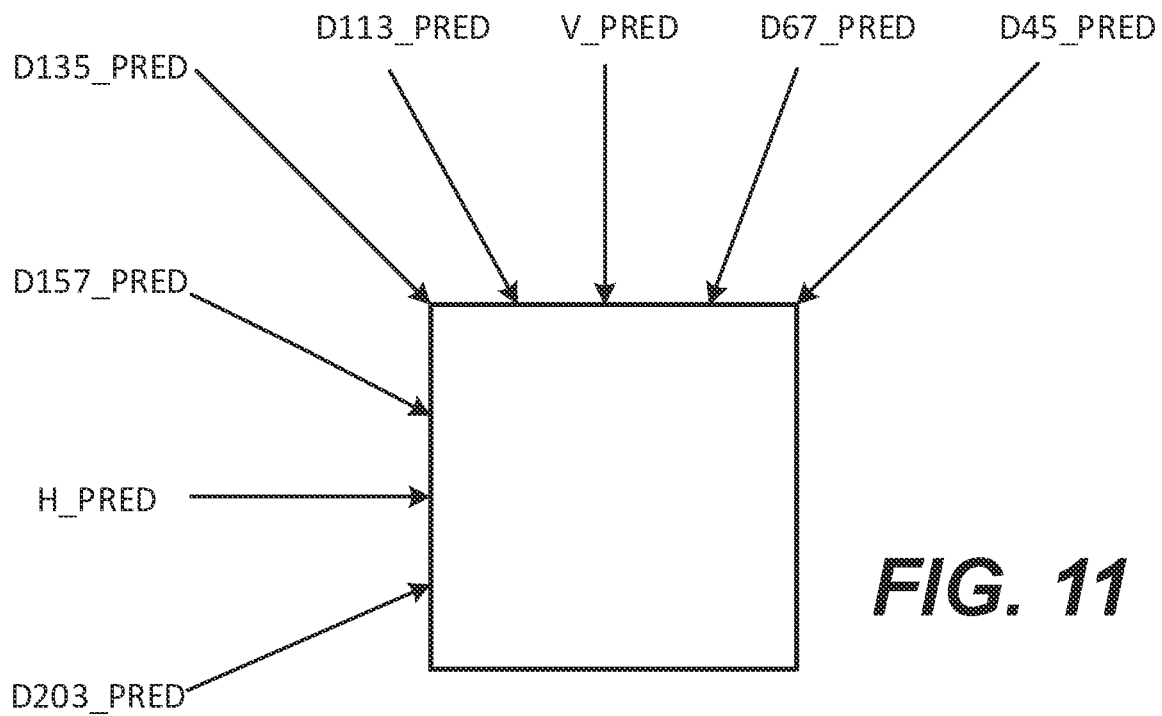
FIG. 11 shows nominal angles in directional intra-prediction.

In some implementations, a set of intra prediction modes (interchangeably referred to as "intra modes") may include a predefined number of directional intra prediction modes. These intra prediction modes may correspond to a predefined number of directions along which out-of-block samples are selected as prediction for samples being predicted in a particular block. In another particular example implementation, eight (8) main directional modes corresponding to angles from 45 to 207 degrees to the horizontal axis may be supported and predefined. In some other implementations of intra prediction, to further exploit more varieties of spatial redundancy in directional textures, directional intra modes may be further extended to an angle set with finer granularity. For example, the 8-angle implementation above may be configured to provide eight nominal angles, referred to as V_PRED, H_PRED, D45_PRED, D135_PRED, D113_PRED, D157_PRED, D203_PRED, and D67_PRED, as illustrated in FIG. 11, and for each nominal angle, a predefined number (e.g., 7) of finer angles may be added. With such an extension, a larger total number (e.g., 56 in this example) of directional angles may be available for intra prediction, corresponding to the same number of predefined directional intra modes. A prediction angle may be represented by a nominal intra angle plus an angle delta. For the particular example above with 7 finer angular directions for each nominal angle, the angle delta may be −3~3 multiplies a step size of 3 degrees. Some as angular scheme may be used, as shown in FIG. 10 with 65 different prediction angles. In some implementations, 8 nominal modes together with 5 non-angular smooth modes are firstly signaled, then if current mode is angular mode, an index is further signaled to indicate the angle delta to the corresponding nominal angle. In some implementations, to implement directional prediction modes via a generic way, all the 56 directional intra prediction mode may be implemented with a unified directional predictor that projects each pixel to a reference sub-pixel location and interpolates the reference pixel by a 2-tap bilinear filter.

Transform of a residual of either an intra prediction block or an inter prediction block may then be implemented followed by quantization of the transform coefficient. For the purpose of performing transform, both intra and inter coded blocks may be further partitioned into multiple transform blocks (sometimes interchangeably used as "transform units", even though the term "unit" is normally used to represent a congregation of the three-color channels, e.g., a "coding unit" would include luma coding block, and chroma coding blocks) prior to the transform. In some implementations, the maximum partitioning depth of the coded blocks (or prediction blocks) may be specified (the term "coded blocks" may be used interchangeably with "coding blocks"). For example, such partitioning may not go beyond 2 levels. The division of prediction block into transform blocks may be handled differently between intra prediction blocks and inter prediction blocks. In some implementations, however, such division may be similar between intra prediction blocks and inter prediction blocks.

In some example implementations, and for inter coded blocks, the transform unit partitioning may be done in a recursive manner with the partitioning depth up to a predefined number of levels (e.g., 2 levels). Split may stop or continue recursively for any sub partition and at any level. For example, one block is split into four quadtree sub blocks and one of the subblocks is further split into four second level transform blocks whereas division of the other subblocks stops after the first level, yielding a total of 7 transform blocks of two different sizes. In some implementations, the transform partitioning may support 1:1 (square), 1:2/2:1, and 1:4/4:1 transform block shapes and sizes ranging from 4×4 to 64×64. In some example implementations, if the coding block is smaller than or equal to 64×64, the transform block partitioning may only be applied to luma component (in other words, the chroma transform block would be the same as the coding block under that condition). Otherwise, if the coding block width or height is greater than 64, both the luma and chroma coding blocks may be implicitly split into multiples of min (W, 64)×min (H, 64) and min (W, 32)×min (H, 32) transform blocks, respectively.

Each of the transform blocks above may then be subject to a primary transform. The primary transform essentially moves the residual in a transform block from spatial domain to frequency domain. In some implementation of the actual primary transform, in order to support the example extended coding block partitions above, multiple transform sizes (ranging from 4-point to 64-point for each dimension of the two dimensions) and transform shapes (square; rectangular with width/height ratio's 2:1/1:2, and 4:1/1:4) may be allowed.

Turning to the actual primary transform, in some example implementations, a 2-D transform process may involve a use of hybrid transform kernels (which, for example, may be composed of different 1-D transforms for each dimension of the coded residual transform block). Example 1-D transform kernels may include but are not limited to: a) 4-point, 8-point, 16-point, 32-point, 64-point DCT-2; b) 4-point, 8-point, 16-point asymmetric DST's (DST-4, DST-7) and their flipped versions; c) 4-point, 8-point, 16-point, 32-point identity transforms. Selection of transform kernels to be used for each dimension may be based on a rate-distortion (RD) criterion.

In some example implementations, the availability of hybrid transform kernels for a particular primary transform implementation may be based on the transform block size and prediction mode. For a chroma component, the transform type selection may be performed in an implicit way. For example, for intra prediction residuals, the transform type may be selected according to the intra prediction mode. For inter prediction residuals, the transform type for chroma blocks may be selected according to the transform type selection of the co-located luma blocks. Therefore, for chroma component, there is no transform type signaling in the bitstream.

Figure 12:
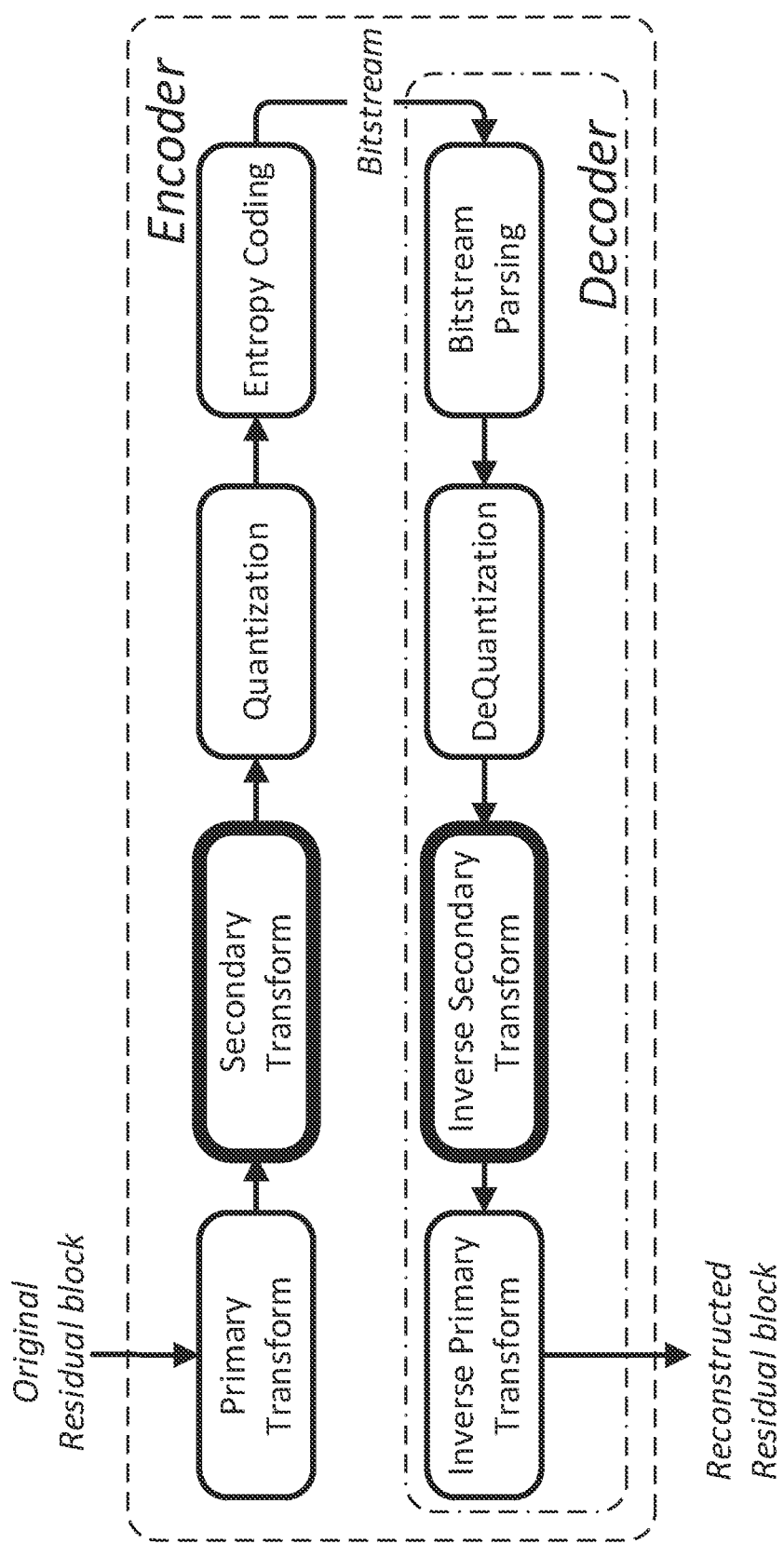
FIG. 12 shows a schematic diagram of using secondary transform in encoding and decoding processes.

In some implementations, for intra prediction residual blocks of luma color component, a secondary transform method, namely intra secondary transform (IST) may be applied to the primary transform coefficient block before applying quantization at the encoder. Accordingly, a secondary inverse transform may be applied to a dequantized transform coefficient block before applying the inverse primary transform at the decoder. IST is not applied to the chroma color components. The use of IST in the encoding and decoding process is illustrated in FIG. 12.

In some implementations using IST, a non-separable transform process is applied. To apply a forward non-separable transform to a specific region of the input transform coefficient block that consists of N samples, the N samples are first organized as an N×1 vector ($\vec{x}$) using the coefficient scanning order according to the relative coordinate of each sample in the input N samples. Then an N×N transform kernel (K) is selected, and the non-separable transform is performed using the following arithmetic operation: $\vec{y}=K\cdot\vec{x}$, where $\vec{y}$ is the output N×1 vector that replaces a specific region of the transform coefficient block using the coefficient scanning order.

In some implementations to apply an inverse non-separable transform, the dequantized transform coefficient block is first given as input, then a specific region of the dequantized transform coefficient block is identified based on the transform block size. An input vector $\vec{y}'$ is formed by reorganizing the transform coefficient using the coefficient scanning order. Given the selected N×N transform kernel and input vector $\vec{y}'$, the inverse non-separable transform is performed using the following arithmetic operation: $\vec{x}'=K^T\cdot\vec{y}'$, where $(\bullet)^T$ refers to the matrix transpose operation. The output $\vec{x}'$ is an N×1 vector that replaces a specific region of the input block following the specific coefficient scanning order.

In some implementations, the input to the forward IST is a coefficient vector that consists of the low frequency primary transform coefficients in zig-zag scan. According to the block size, either a 16-point or 64-point non-separable secondary transform can be selected. When the minimum value of the primary transform width and primary transform height is less than 8, the 16-point IST is used, and the low frequency primary transform coefficients refer to the first 16 primary transform coefficients in zig-zag scan order. When both of the primary transform width and height are greater than or equal to 8, the 64-point IST is applied, and the low frequency primary transform coefficients refer to the first 64 primary transform coefficients in zig-zag scan order. The 16-point non-separable transform uses an 8×16 transform kernel, and the 64-point non-separable transform uses a 32×64 transform kernel. Moreover, when IST is applied, the high frequency transform coefficients that are not processed by secondary transform are zeroed out.

In some implementations, there may be total 12 secondary transform sets (or IST sets) are defined, each of which contains 3 secondary transform kernels. For each intra coded transform block, the nominal intra prediction mode and primary transform type is identified first, then the IST set is selected based on Table 1. In some implementations, for Paeth prediction mode and recursive intra prediction modes. IST is neither applied nor signaled.

TABLE 1

Mapping from intra nominal mode and primary transform type to IST set

| intra nominal mode | primary transform type | IST set index |
|---|---|---|
| DC_PRED | DCT only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |
| SMOOTH_V | | 1 |
| SMOOT_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOT_H | | 8 |

In some implementations, given the IST set, there may be four encoder options: 1) no secondary transform, 2) secondary transform using the first transform kernel in the given IST set, 3) secondary transform kernel using the second transform kernel in the given IST set, and/or 4) secondary transform kernel using the third transform kernel in the given IST set. In some implementations, the encoder signals the selection using the using the syntax element ist_idx. At the decoder, the value of syntax element ist_idx is parsed first. Then, given the IST set and value associated with ist_idx, the secondary transform kernel is identified. This syntax element ist_idx is signaled for each luma transform block after the signaling of primary transform type. The signaling of ist_idx is performed when all of the following conditions are true: the current block is an intra coded luma transform block; the primary transform type is DCT in both dimensions or ADST in both dimensions; the intra prediction mode is neither Paeth prediction mode nor recursive intra prediction mode; the transform partitioning depth is 0; and the end-of-block (EOB) position falls within the low-frequency transform coefficient region where secondary transform is applicable. In some implementations, the entropy coding context for ist_idx is derived based on the transform block size.

In some implementation, secondary transform on the primary transform coefficients may be performed. For example, LFNST (low-frequency non-separable transform), which is known as reduced secondary transform may be applied between forward primary transform and quantization (at encoder) and between de-quantization and inverse primary transform (at decoder side) to further decorrelate the primary transform coefficients. In essence, LFNST may take a portion of the primary transform coefficient, e.g., the low frequency portion (hence "reduced" from the full set of primary transform coefficients of the transform block) to proceed to secondary transform. In an example LFNST, 4×4 non-separable transform or 8×8 non-separable transform may be applied according to transform block size. For example, 4×4 LFNST may be applied for small transform blocks (e.g., min (width, height)<8) whereas 8×8 LFNST may be applied for larger transform blocks (e.g., min (width, height)>8). For example, if an 8×8 transform block is subject to 4×4 LFNST, then only the low frequency 4×4 portion of the 8×8 primary transform coefficients further undergo secondary transform.

In some implementations, to perform primary transform on a residual block, a primary transform kernel needs to be specified. A primary transform kernel is a primary transform matrix consists of transform basis vectors, and the transform process is essentially a matrix multiplication of a residual block and the given primary transform matrix, and the output of the transform process is a transform coefficient block. In some implementations, to further perform secondary transform on a transform coefficient block, a secondary transform kernel needs to be specified. A secondary transform kernel is a matrix of secondary transform coefficients, and the secondary transform process is essentially a matrix multiplication of transform coefficient block and the given secondary transform matrix. In some implementations, transform may be classified as separable and non-separable transform. Separable transform performs transform on a 2-D block by doing 1-D transform on each row (or column) first, which derives an intermediate coefficient block, and then doing 1-D transform on each column (or row) of this intermediate coefficient block. Meanwhile, a 2-D non-separable transform defines its transform bases in a 2-D format, i.e., each transform basis is 2-D instead of 1-D as in separable transform. One feasible way to perform a non-separable 2-D transform is to reshape a 2-D block into a 1-D vector with same number of elements, and then applying a 1-D transform bases on this reshaped 1-D input vector, the output is then reshaped back into a 2-D transform coefficient block.

There are some issues/problems associated with how a plurality of transform kernels are organized. The present disclosure describes various embodiments for a transform dictionary, which may have a hierarchy structure to organize a plurality of transform kernels, enhancing efficiency in term of constructing, signaling, or switching transform used in transform coding/encoding in various circumstances, and improving the transform coding/encoding field for video coding/encoding.

In various embodiments, a transform hierarchy may include two or more levels, for example three levels. In one example, the overall hierarchy structure may be referred as a transform dictionary (or other proper names), the next level is called a transform pile level (or other proper names), the second next level is called a transform set level, and/or the third next level is called a transform kernel level. A transform dictionary defines all the transform piles that can be used for encoding and decoding, a transform pile includes multiple transform sets, and the selection of transform set inside a transform pile can be signaled or implicitly derived (e.g., based on coded information such as intra prediction mode).

Figure 13:
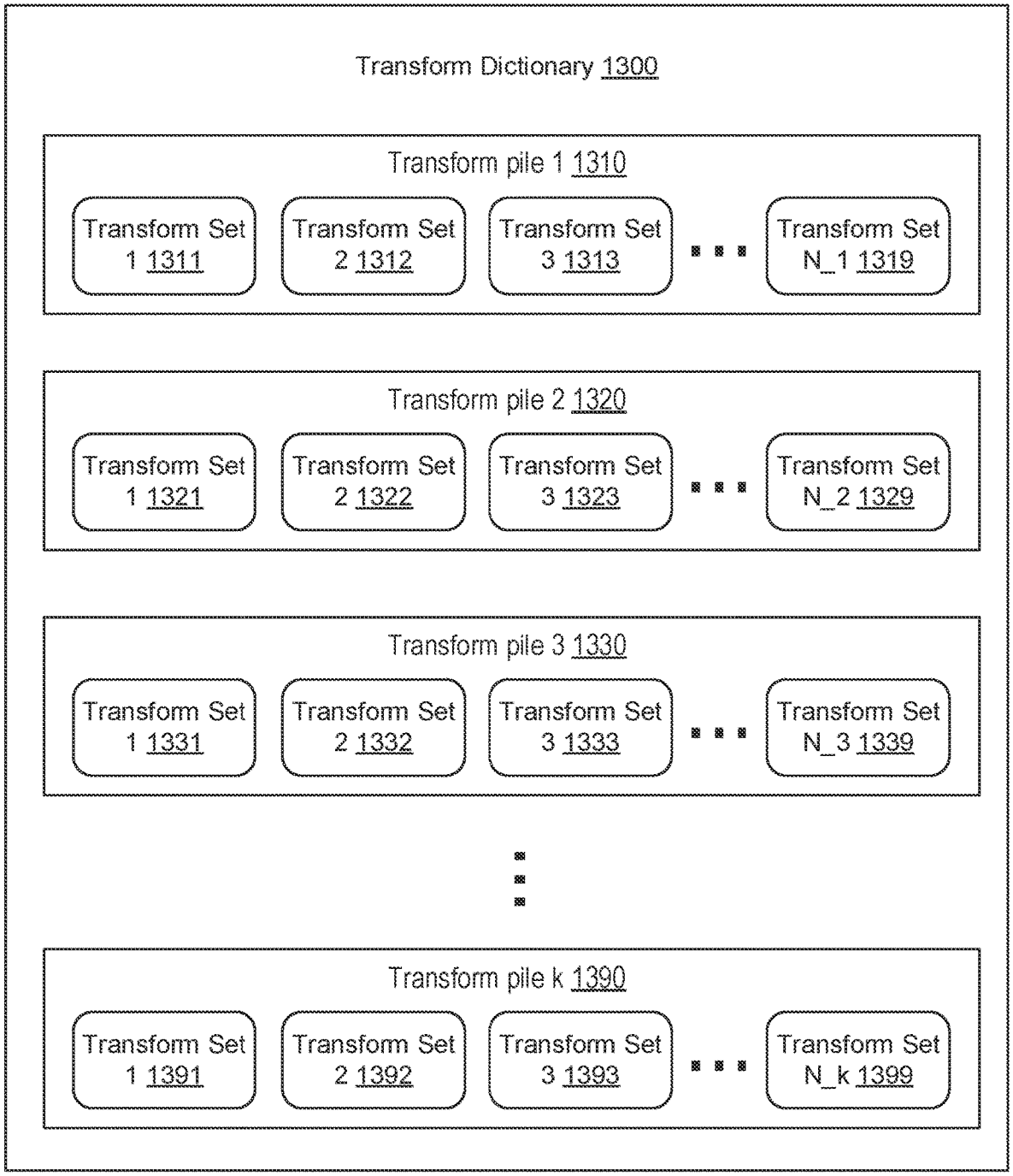
FIG. 13 shows an exemplary hierarchy structure of a transform dictionary.

As shown in FIG. 13, a transform dictionary 1300 includes multiple transform piles (1310, 1320, 1330, . . . , and 1390).

Each transform pile may include a number of transform sets. In some implementations, a first transform pile (transform pile 1, 1310) may include N_1 transform sets, wherein N_1 is a non-negative integer: for example, a first transform set (transform set 1, 1311), a second transform set (transform set 2, 1312), a third transform set (transform set 3, 1313), . . . , a N_1-th transform set (transform set N_1, 1319). In some implementations, a second transform pile (transform pile 2, 1320) may include N_2 transform sets, wherein N_2 is a non-negative integer: for example, a first transform set (transform set 1, 1321), a second transform set (transform set 2, 1322), a third transform set (transform set 3, 1333) . . . a N_2-th transform set (transform set N_2, 1329). In some implementations, a third transform pile (transform pile 1, 1330) may include N_3 transform sets, wherein N_3 is a non-negative integer: for example, a first transform set (transform set 1, 1331), a second transform set (transform set 2, 1332), a third transform set (transform set 3, 1333), . . . , a N_3-th transform set (transform set N_3, 1339). In some implementations, a k-th transform pile (transform pile k, 1390) may include N_k transform sets, wherein N_k is a non-negative integer: for example, a first transform set (transform set 1, 1391), a second transform set (transform set 2, 1392), a third transform set (transform set 3, 1393), . . . , a N_k-th transform set (transform set N_k, 1399).

Each transform set may include a number of transform kernels, and the selection of transform kernel inside a transform set may be signaled or implicitly derived (e.g., based on coded information such as intra prediction mode or relative position of a transform block inside the coding block).

In some implementations, each transform pile may include a number of selected transform sets for better transform coding in a certain circumstance. For non-limiting examples, one transform pile may include transform sets for better transform coding for gaming videos, and another transform pile may include transform sets for better transform coding for conference video.

In some implementations, only one transform pile can be used for a sequence/group of pictures (GOP)/a picture/subpicture/slice/tile. In some implementations, the selection of transform set inside a transform pile may be signaled or implicitly derived (e.g., based on coded information such as intra prediction mode).

Various embodiments and/or implementations described in the present disclosure may be performed separately or combined in any order, and may be applicable for decoding, encoding, or streaming. Further, each of the methods (or embodiments), encoder, and decoder may be implemented by processing circuitry (e.g., one or more processors or one or more integrated circuits). The one or more processors execute a program that is stored in a non-transitory computer-readable medium. In the present disclosure, the term block may be interpreted as a prediction block, a coding block, or a coding unit (CU).

Figure 14:
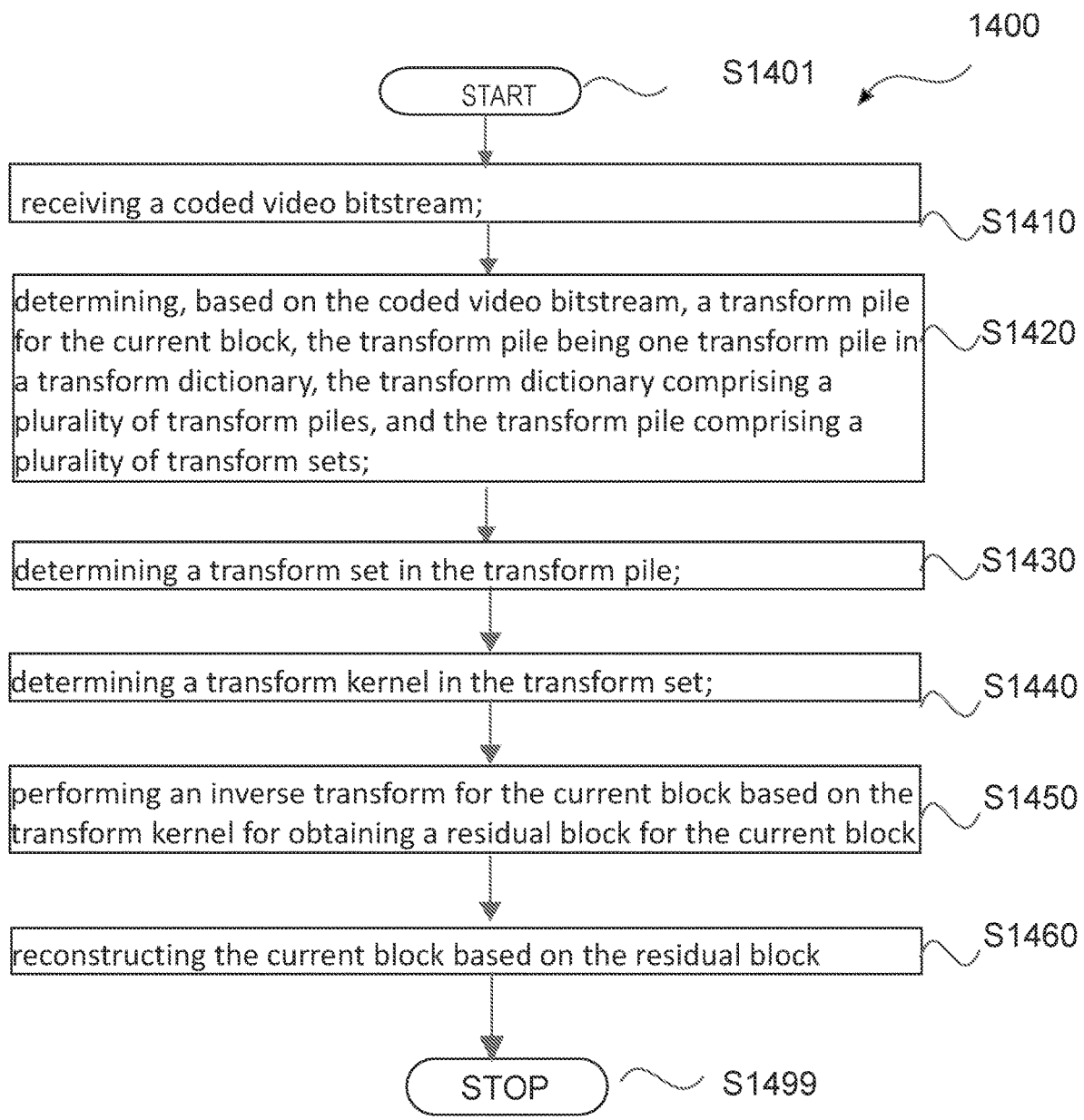
FIG. 14 shows an example logic flow for a method in the present disclosure.

FIG. 14 shows a flow chart 1400 of an exemplary method following the principles underlying the implementations above for a transform dictionary. The exemplary decoding method flow starts at 1401, and may include a portion or all of the following steps: S1410, receiving the coded video bitstream; S1420, determining, based on the coded video bitstream, a transform pile for the current block, the transform pile being one transform pile in a transform dictionary, the transform dictionary comprising a plurality of transform piles, and the transform pile comprising a plurality of transform sets; S1430, determining a transform set in the transform pile; S1440, determining a transform kernel in the transform set; S1450, performing an inverse transform for the current block based on the transform kernel for obtaining a residual block for the current block; and/or S1460, reconstructing the current block based on the residual block. The example method stops at S1399. The method 1400 may be preformed by a device comprising a memory storing instructions and a processor in communication with the memory.

In any portion or combination of the implementations above, the determining the transform pile for the current block comprises a portion or all of the following: extracting, by the device based on the coded video bitstream, a syntax for indicating the transform pile; and/or selecting, by the device based on the syntax, the transform pile from the plurality of transform piles.

In any portion or combination of the implementations above, the determining the transform pile for the current block comprises: deriving, by the device, an index for selecting the transform pile from the plurality of transform piles based on at least one of the following: one or more quantization parameter, a spatial resolution of the coded video bitstream, a temporal resolution of the coded video bitstream, a bit depth of the coded video bitstream, or a reconstructed sample from a previous group of pictures, a picture, a subpicture, a slice, or a tile.

In any portion or combination of the implementations above, the determining the transform pile for the current block comprises a portion or all of the following: extracting, by the device based on the coded video bitstream, a flag indicating whether the transform pile is modified; and/or in response to the flag indicating that the transform pile is not modified, determining, by the device, a previous transform pile for a previous block as the transform pile for the current block.

In any portion or combination of the implementations above, the determining the transform pile for the current block comprises a portion or all of the following: extracting, by the device based on the coded video bitstream, a group of indexes indicating a group of transform sets from a group of candidate transform sets; and/or constructing, by the device, the transform pile to comprise the group of transform sets based on the group of indexes.

In any portion or combination of the implementations above, the determining the transform pile for the current block comprises a portion or all of the following: for the transform set in the transform pile, extracting, by the device based on the coded video bitstream, a flag indicating whether the transform set is updated; and/or in response to the flag indicating that the transform set is updated: extracting, by the device based on the coded video bitstream, an index indicating an updated transform set from a group of candidate transform sets, and/or updating, by the device, the transform pile by replacing the transform set with the updated transform set.

In any portion or combination of the implementations above, each transform pile of the plurality of transform piles comprises different number of transform sets.

In any portion or combination of the implementations above, the determining the transform pile for the current block comprises: extracting, by the device based on the coded video bitstream, a syntax indicating a number of transform sets in the transform pile.

In any portion or combination of the implementations above, the transform set is one transform set in the transform pile.

In any portion or combination of the implementations above, two or more different transform piles in the transform dictionary comprise one or more same transform set.

In any portion or combination of the implementations above, separable transform kernels in two or more different transform piles in the transform dictionary are same.

In any portion or combination of the implementations above, separable non-Karhunen Lòeve Transform (non-KLT) transform kernels in two or more different transform piles in the transform dictionary are same.

In any portion or combination of the implementations above, different transform kernels in the transform dictionary comprise one or more same base.

In various embodiments in the present disclosure, there may be at least one transform dictionary to select the transform kernels used to perform encoding and decoding of a block. The transform dictionary includes more than one transform pile.

In one embodiment for video coding/decoding, one transform pile is selected for coding the current sequence, group of picture (GOP), picture, subpicture, slice or tile. The selection of transform pile may be explicitly signaled accordingly at sequence, GOP, picture, subpicture, slice or tile-level, respectively; or the selection of transform pile may be implicitly derived based on coded information, including but not limited to, quantization parameters, spatial and/or temporal resolution of the video, bit depth of the video, the value of any other signaled syntaxes, the reconstructed samples from a previous GOP, picture, subpicture, slice or tile.

In one embodiment for video coding/decoding, a flag is signaled to indicate whether the transform pile is modified or not. When the flag is signaled with a value indicating that transform pile does not need to be changed, a same transform pile that has been used is applied. Otherwise, when the flag is signaled with a value indicating that transform pile is changed, the modifications to the transform pile is further signaled using any method in any other implementations/embodiments as described in the present disclosure.

In one embodiment, one transform pile is selected for coding the current sequence, GOP, picture, subpicture, slice or tile, and the selection of transform pile can be specified by signaling the index of selected transform set picked from a group of transform sets for each slot of transform set in this transform pile.

In one example, for a specific slot of transform set inside a transform pile, a flag is signaled to indicate whether the transform set needs to be updated or not, if this flag is signaled with a value indicating the transform set needs to be updated, then an index of a selected transform set from (depository) a group of transform sets is further signaled form a group of candidates transform sets.

In one embodiment, for different transform piles, different numbers of transform sets may be specified. For example, as shown in FIG. 13, $N\_1, N\_2, \ldots N\_k$, which specify the number of transform sets of the pile 1 to N, may be different from each other. In some implementations, $N\_1, N\_2, \ldots N\_k$, which specify the number of transform sets of the pile 1 to N, may be same. In one embodiment, to signal the transform sets used for a specific transform pile, for each slot of transform set in the transform pile, a selected transform set index from a depository (selected from a group of candidates transform sets) is signaled. In one embodiment, to signal the transform pile, the number of transform sets (i.e., the number of slots for transform sets) is signaled.

In one embodiment, given the selected transform pile, only transform sets included in the selected transform pile can be applied at the level on which transform pile selection is signaled. In one embodiment, different transform piles may share one or more transform sets. In one embodiment, for different transform piles, the separable transform kernels are the same. In one embodiment, for different transform piles, the separable non-KLT (Karhunen Lòeve Transform) transform kernels are the same. In one embodiment, different transform kernels may share some of the bases.

Various embodiments in the present disclosure may include methods for encoding a current block into a video bitstream, which are performed by an encoder, including inverse processes as any portion or all of the processes that are described for the decoder.

Various embodiments in the present disclosure may include methods for encoding a current block for streaming video, which are performed by one or more electronic device (e.g., streaming media player), including any portion or all of the processes for the decoder and/or any portion or all of the processes that are described for an encoder.

Operations above may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media. For example, FIG. 15 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 15 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a current block in a coded video bitstream, the method comprising:
   receiving, by a device comprising a memory storing instructions and a processor in communication with the memory, the coded video bitstream;
   determining, by the device based on the coded video bitstream, a transform pile for the current block, the transform pile being one transform pile in a transform dictionary, the transform dictionary comprising a plurality of transform piles, and the transform pile comprising a plurality of transform sets;
   determining, by the device, a transform set in the transform pile;
   determining, by the device, a transform kernel in the transform set;
   performing, by the device, an inverse transform for the current block based on the transform kernel for obtaining a residual block for the current block; and
   reconstructing, by the device, the current block based on the residual block.

2. The method according to claim 1, wherein the determining the transform pile for the current block comprises:
   extracting, by the device based on the coded video bitstream, a syntax for indicating the transform pile; and
   selecting, by the device based on the syntax, the transform pile from the plurality of transform piles.

3. The method according to claim 1, wherein the determining the transform pile for the current block comprises:
   deriving, by the device, an index for selecting the transform pile from the plurality of transform piles based on at least one of the following: one or more quantization parameter, a spatial resolution of the coded video bitstream, a temporal resolution of the coded video bitstream, a bit depth of the coded video bitstream, or a reconstructed sample from a previous group of pictures, a picture, a subpicture, a slice, or a tile.

4. The method according to claim 1, wherein the determining the transform pile for the current block comprises:
- extracting, by the device based on the coded video bitstream, a flag indicating whether the transform pile is modified; and
- in response to the flag indicating that the transform pile is not modified, determining, by the device, a previous transform pile for a previous block as the transform pile for the current block.

5. The method according to claim 1, wherein the determining the transform pile for the current block comprises:
- extracting, by the device based on the coded video bitstream, a group of indexes indicating a group of transform sets from a group of candidate transform sets; and
- constructing, by the device, the transform pile to comprise the group of transform sets based on the group of indexes.

6. The method according to claim 1, wherein the determining the transform pile for the current block comprises:
- for the transform set in the transform pile, extracting, by the device based on the coded video bitstream, a flag indicating whether the transform set is updated; and
- in response to the flag indicating that the transform set is updated:
  - extracting, by the device based on the coded video bitstream, an index indicating an updated transform set from a group of candidate transform sets, and
  - updating, by the device, the transform pile by replacing the transform set with the updated transform set.

7. The method according to claim 1, wherein:
each transform pile of the plurality of transform piles comprises different number of transform sets.

8. The method according to claim 1, wherein the determining the transform pile for the current block comprises:
extracting, by the device based on the coded video bitstream, a syntax indicating a number of transform sets in the transform pile.

9. The method according to claim 1, wherein:
the transform set is one transform set in the transform pile.

10. The method according to claim 1, wherein:
two or more different transform piles in the transform dictionary comprise one or more same transform set.

11. The method according to claim 1, wherein:
separable transform kernels in two or more different transform piles in the transform dictionary are same.

12. The method according to claim 1, wherein:
separable non-Karhunen Lòeve Transform (non-KLT) transform kernels in two or more different transform piles in the transform dictionary are same.

13. The method according to claim 1, wherein:
different transform kernels in the transform dictionary comprise one or more same base.

14. An apparatus for decoding a current block of a current frame in a coded video bitstream, the apparatus comprising:
- a memory storing instructions; and
- a processor in communication with the memory, wherein, when the processor executes the instructions, the processor is configured to cause the apparatus to:
  - receive the coded video bitstream;
  - determine, based on the coded video bitstream, a transform pile for the current block, the transform pile being one transform pile in a transform dictionary, the transform dictionary comprising a plurality of transform piles, and the transform pile comprising a plurality of transform sets;
  - determine a transform set in the transform pile;
  - determine a transform kernel in the transform set;
  - perform an inverse transform for the current block based on the transform kernel for obtaining a residual block for the current block; and
  - reconstruct the current block based on the residual block.

15. The apparatus according to claim 14, wherein, when the processor is configured to cause the apparatus to determine the transform pile for the current block, the processor is configured to cause the apparatus to:
- extract, based on the coded video bitstream, a syntax for indicating the transform pile; and
- select, based on the syntax, the transform pile from the plurality of transform piles.

16. The apparatus according to claim 14, wherein, when the processor is configured to cause the apparatus to determine the transform pile for the current block, the processor is configured to cause the apparatus to:
- extract, based on the coded video bitstream, a group of indexes indicating a group of transform sets from a group of candidate transform sets; and
- construct the transform pile to comprise the group of transform sets based on the group of indexes.

17. The apparatus according to claim 14, wherein,
each transform pile of the plurality of transform piles comprises different number of transform sets.

18. The apparatus according to claim 14, wherein, when the processor is configured to cause the apparatus to determine the transform pile for the current block, the processor is configured to cause the apparatus to:
extract, based on the coded video bitstream, a syntax indicating a number of transform sets in the transform pile.

19. The apparatus according to claim 14, wherein,
two or more different transform piles in the transform dictionary comprise one or more same transform set.

20. A non-transitory computer readable storage medium storing instructions, wherein, when the instructions are executed by a processor, the instructions are configured to cause the processor to:
- receive the coded video bitstream;
- determine, based on the coded video bitstream, a transform pile for the current block, the transform pile being one transform pile in a transform dictionary, the transform dictionary comprising a plurality of transform piles, and the transform pile comprising a plurality of transform sets;
- determine a transform set in the transform pile;
- determine a transform kernel in the transform set;
- perform an inverse transform for the current block based on the transform kernel for obtaining a residual block for the current block; and
- reconstruct the current block based on the residual block.

* * * * *